Figure 1:
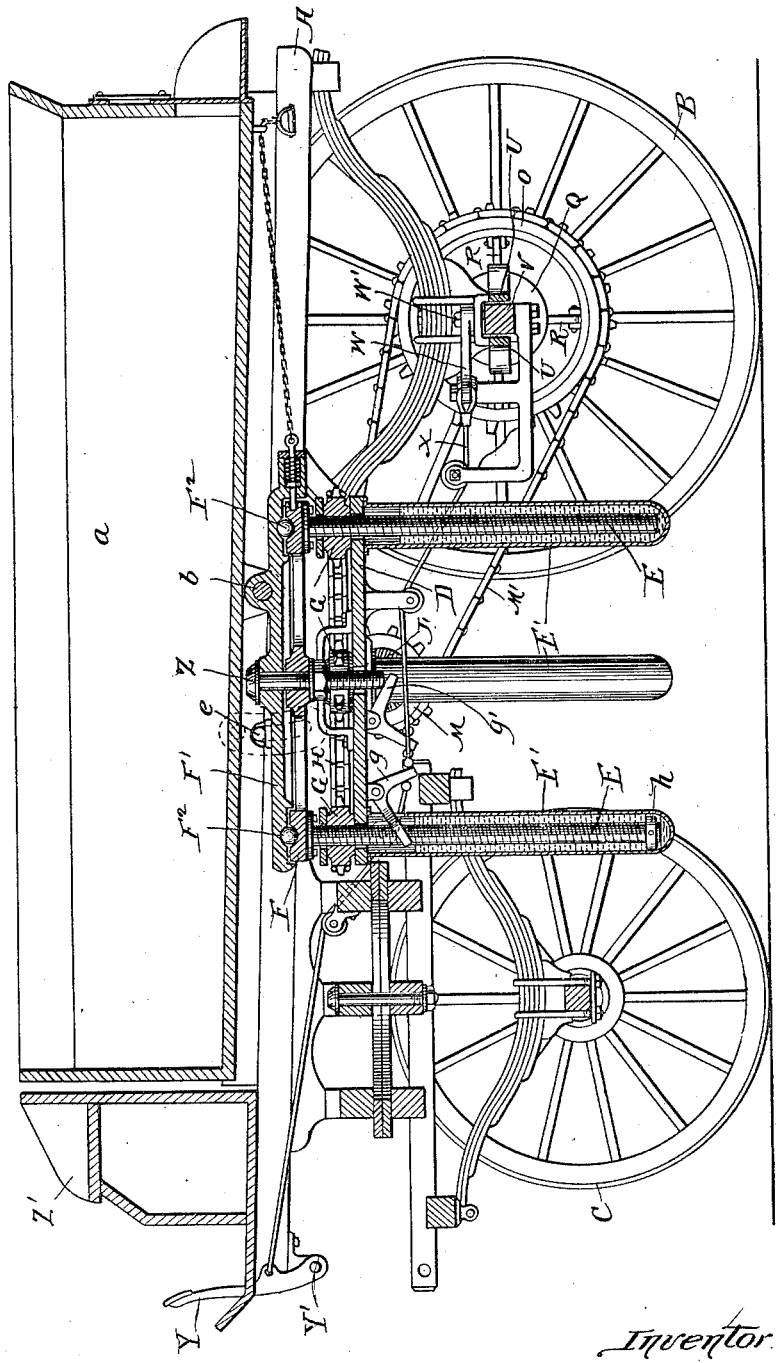

No. 661,219. Patented Nov. 6, 1900.
T. LEE.
DUMPING WAGON.
(Application filed Mar. 26, 1900.)
(No Model.) 3 Sheets—Sheet 1.

Witnesses
H. B. Hallock.
A. J. Williamson

Inventor
Thomas Lee.
By Geo. E. Hyde Atty.

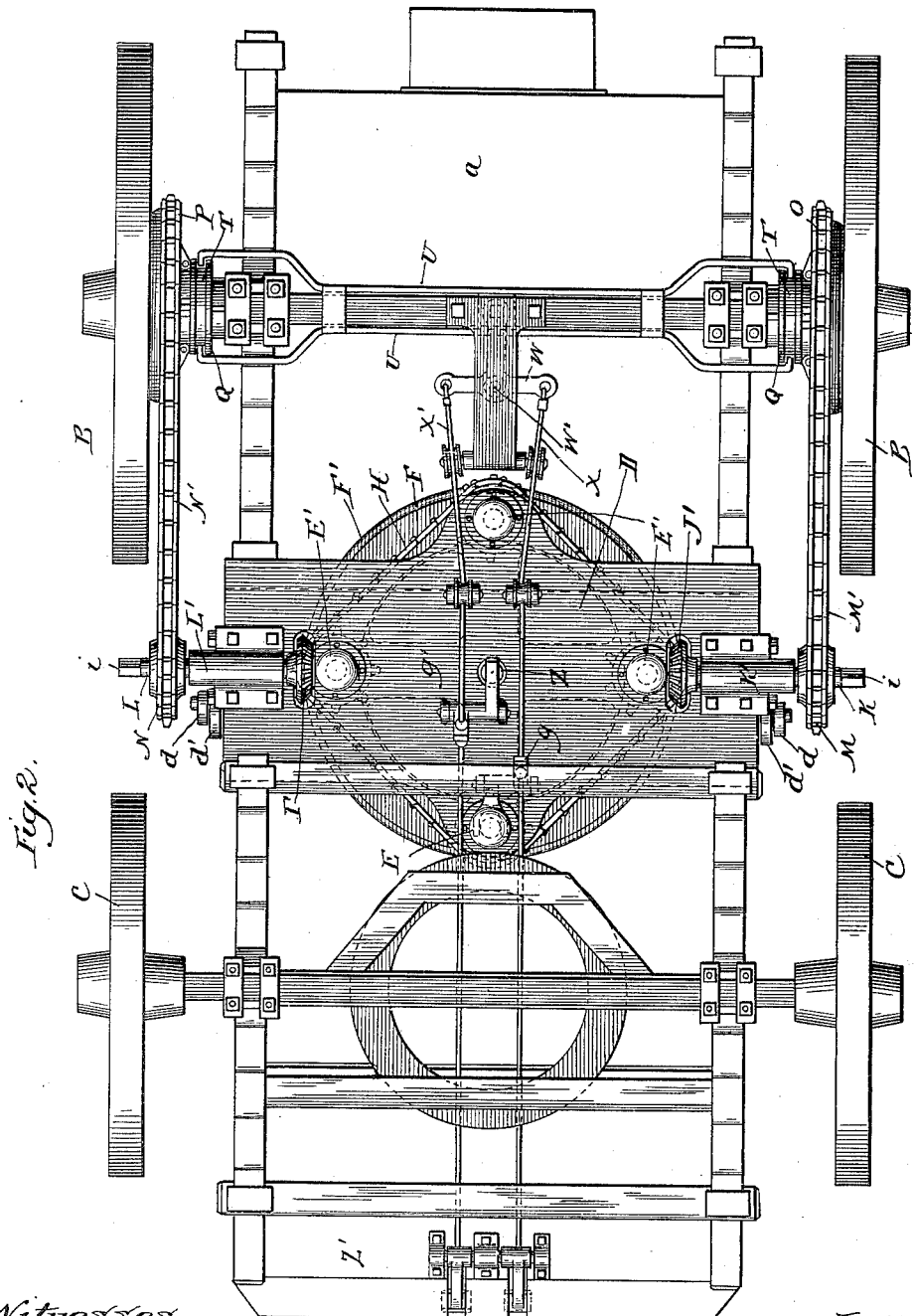

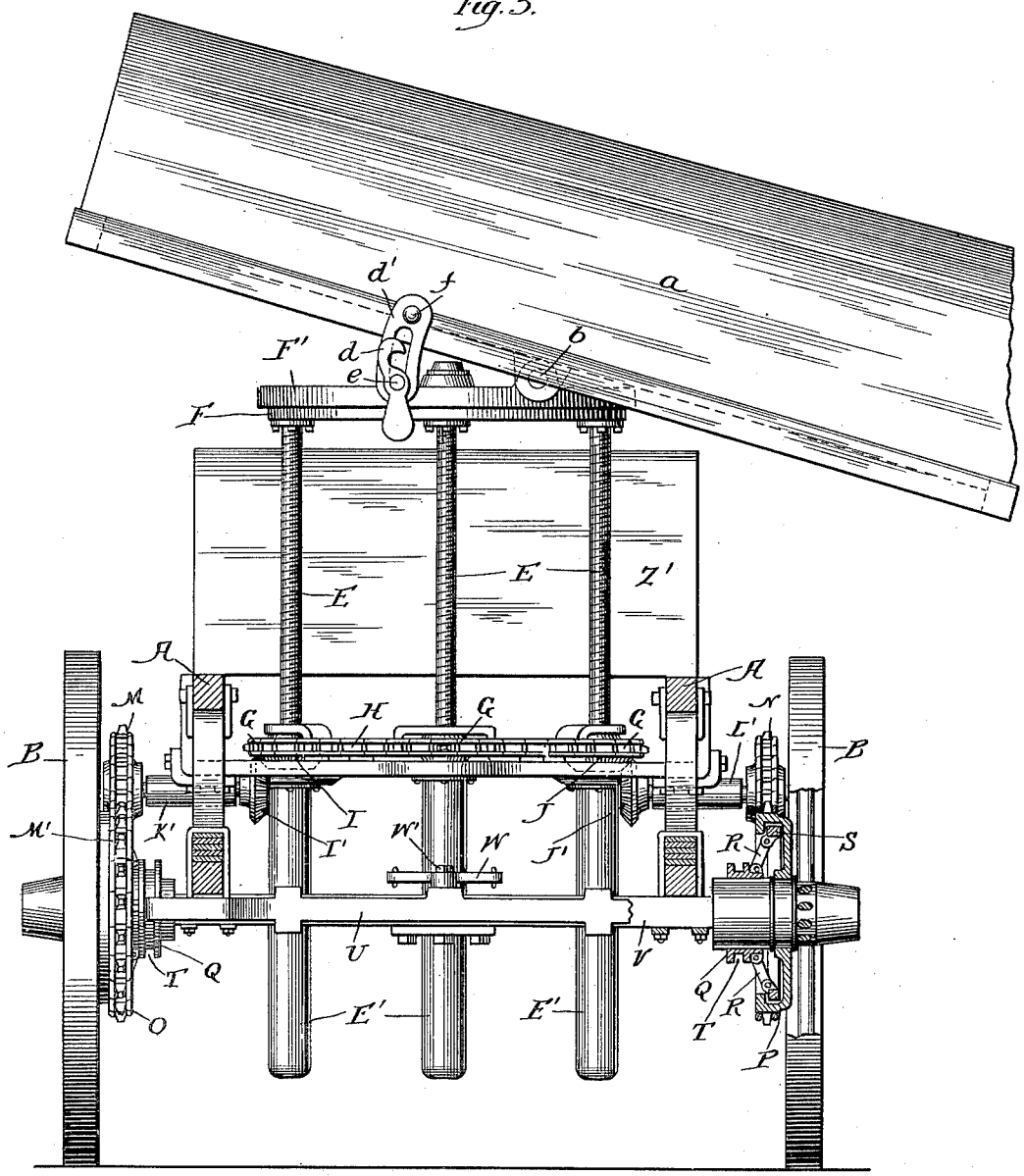

UNITED STATES PATENT OFFICE.

THOMAS LEE, OF PHILADELPHIA, PENNSYLVANIA, ASSIGNOR OF ONE-THIRD TO WILLIAM DAY ROWLAND, OF SAME PLACE.

DUMPING-WAGON.

SPECIFICATION forming part of Letters Patent No. 661,219, dated November 6, 1900.

Application filed March 26, 1900. Serial No. 10,299. (No model.)

*To all whom it may concern:*

Be it known that I, THOMAS LEE, a citizen of the United States, residing at Philadelphia, county of Philadelphia, and State of Pennsylvania, have invented a certain new and useful Improvement in Dumping-Wagons, of which the following is a specification.

My invention relates to a new and useful improvement in dumping-wagons, and especially those used for delivering coal, and has for one object to so construct such a wagon as to provide for automatically elevating the body thereof by the forward movement of the wagon or the lowering of the same by the same movement of the wagon; and a further object of my invention is to so support the body and connect it with the running-gear as to permit it to be turned at right angles to the wagon for the delivery of the load while the wagon is standing parallel with the curb.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a central longitudinal section of a wagon made in accordance with my improvement, showing the body in its lowered position and illustrating the mechanism for manipulating the same. Fig. 2 is a bottom plan illustrating the automatic mechanism for imparting power from the rear wheels to the elevating mechanism; and Fig. 3 a rear elevation of the wagon, a portion thereof being sectioned away, so as to more clearly show the arrangement of the operating mechanism, the body being elevated and inclined to the position for delivering the coal.

In carrying out my invention as here embodied, A represents the frame or running-gear, which is mounted upon the rear wheels B and the front wheels C. Secured to the framework is a platform D, through which are passed the elevating screw-rods E, having supported upon their upper ends the stationary member F of a turn-table. Each of these screw-rods, which are four in number, passes through a nut G, the periphery of which is in the form of a sprocket-wheel, and these four sprocket-wheels are connected together so as to be revolved in unison by the endless sprocket-chain H. By this arrangement when the nuts G are revolved the screw-rods, which are held stationary by being secured to the member F, will be fed up or down, as the case may be, and the revolving of the nuts is accomplsihed by the beveled gears I and J, formed upon the two side nuts, with which gears mesh corresponding gears I' and J'. The gears I' and J' are secured upon the crank-shafts K and L, which are journaled in the bearings K' and L' upon the under side of the frame, while the sprocket-wheels M and N are secured upon the outer portion of these crank-shafts and connected by the sprocket-chains M' and N' with the sprocket-wheels O and P, respectively. These last-named sprocket-wheels are loosely journaled upon the hubs of the rear wheels of the wagon, so that normally the revolving of the wagon-wheels will not affect the movements of the sprocket-wheels, and consequently have no effect upon the mechanism just described.

A clutch mechanism is provided for each of the sprocket-wheels O and P and is under the control of the periphery, so that either of these wheels may be locked to its corresponding wagon-wheel, thus causing the mechanism connected therewith to be operated for the purpose hereinbefore set forth. The construction of each of the clutch mechanisms is as follows:

Q is a collar which is splined to an extension of the hub of the wagon-wheel and has pivoted thereto the toggle-levers R, pivoted also to the clutch-ring S. This ring is fitted to the interior periphery of the sprocket-wheel, so that when the collar Q is forced toward the wagon-wheel the action of the toggle-levers will force the clutch-ring S outward, it being in sections to permit this action, and firmly bind it against the inner periphery of the sprocket-wheel, thereby locking said wheel to the hub of the wagon-wheel, which will cause it to revolve in unison therewith and impart motion to the sprocket-chain which operates one of the crank-shafts. The clutch-collars Q have formed therein the annular grooves T, with which the bent ends of the shifting rods U engage, and these rods are fitted to slide lengthwise upon the rear axle V, so that by their lateral movement the two clutch-collars will be moved in unison, and when these shifting rods are in a central position both clutches will be unlocked, thus disengaging the sprocket-wheels from the rear wheels of the wagon; but upon the movement of the shifting rods in either direction one or the other of the clutches will be carried into locked position, as before described, thus causing the corresponding sprocket-wheel to revolve with the wagon-wheel and transmit motion through its sprocket-chain to the corresponding crank-shaft.

The shifting rods have connected therewith the central member of the triple lever W, which is pivoted at W', the two side members thereof having attached thereto the rods X and X'. These rods pass forward over suitable guide-pulleys and are connected at their forward end to the foot-levers Y, which are pivoted at Y' and project within easy reach of the feet of the driver.

It will be obvious from the foregoing description that at any time during the travel of the wagon the driver by throwing the clutch which locks the sprocket-wheel O into action will cause the crank-shaft K to be revolved, and in turn will revolve the nuts G in the proper direction to elevate the screw-rods E, which will carry the stationary member F of the turn-table upward to the point desired, where it may be stopped by bringing the clutch mechanism to its central position. The operation of the opposite clutch will reverse the rotation of the nuts and lower the screw-rods, and all of this is under the control of the driver by means of the foot-levers Y. The stationary member F of the turn-table supports the revolving member F', between which the balls $F^2$ may be interposed to reduce the friction, and a centering-pin Z serves to hold these members in their relatively proper position.

The body $a$ of the wagon is hinged to the revolving member F' by means of the bolt-rod $b$ passing through suitable lugs formed upon said member and the under side of the body, and the point at which the body is thus hinged should bear such relation thereto as to facilitate the tilting of the body to the position for shooting the coal therefrom—that is to say, the body, with its load, should be heavier at the rear of the hinging-point than at the front thereof, so that this weight would tend to swing the body into the tipped position. (Shown in Fig. 3.)

In order that the body may be held against being displaced by its own weight and load before it is desired to unload, a latch $d$ is pivoted to the turn-table at $e$ and adapted to engage the stud $f$, carried by the body, and thus lock the latter in its normal position, and the body is limited in its tipping by the slotted plate $d'$.

While the driver has complete control over the raising and lowering of the body through the foot-levers and clutch mechanism, I have provided an automatic means for throwing the clutches out of action at the extreme upper and lower limit of the movements of the body in order that carelessness upon the part of the driver may not injure the mechanism, and this is accomplished in the following manner: A bell-crank lever $g$ is connected with the rod X, and its inner end embraces one of the screw-rods E, which latter carries the collar $h$, so that when this rod, with the similar rods moving in unison therewith, has been sufficiently elevated to bring the collar $h$ in contact with the inner member of the lever $g$ it will so actuate this lever as to draw the rod X forward, thereby bringing the shifting rods U to their central position, which will unlock the clutch and stop the further elevation of the body. Likewise a bell-crank lever $g'$ has one end attached to the rod X', and its horizontal member is so located that when the body reaches its lower limit the projecting end of the pin Z comes in contact therewith and causes this lever to pull the rod X' to bring the shifting rods U to their central position, thereby stopping the further downward movement of the body, as will be readily understood.

As a protection to the screw-rods E tubular housings E' incase the same, and these housings may be entirely or partially filled with oil, thus constantly lubricating the screw-rods during their operations.

In order that the manipulation of the wagon may be completely under the control of the driver, I provide wrench-holds $i$ on the outer ends of the crank-shafts K and L in order that crank-wrenches may be applied thereto for the revolving of these shafts to bring about the raising or lowering of the body, as may be required.

In practice a wagon constructed in accordance with my improvement may be loaded and driven to the curb parallel therewith and the body thereof swung at right angles to the length of the wagon or crosswise of the pavement and the body tipped, so as to convey the coal to the desired point without blocking the street, as so often occurs by the use of wagons as now constructed. A further advantage of my improved wagon is the increased height to which it may be elevated and remain rigid, which is effected by means of the four screw-rods which act as standards for the support of the body when elevated. The serious objection to the old form of elevated wagons is that it must be first brought to the location where it is to be unloaded and then much time lost and labor expended in elevating the body and adjusting it for the delivery of the load. This is entirely overcome by my improvement, since the driver may when nearing the point of delivery throw into action the proper clutch mechanism to elevate the body by the travel of the wagon, thus accomplishing the result by the draft of the horses and during the time the wagon is proceeding to its destination rather than by hand-power and at the expense of lost time. In the crowded streets of cities these are important considerations and are conveniently and effectually provided for by my improvements.

In order that the driver may not have to dismount during the automatic raising of the body, the seat Z' has no connection with the body, but is supported upon the running-gear or frame.

Of course I do not wish to be limited to the exact details of construction here shown, as these may be varied to a considerable extent without departing from the spirit of my invention—as, for instance, the screw-rods may be elevated by ratchet-nuts and suitable mechanism for accomplishing their proper movements, or by hydraulic or pneumatic appliances, the sole object being to elevate these rods in unison and retain them sufficiently rigid to properly support the body of the wagon while being unloaded. It is also obvious that instead of my improvement being applied to a horsed vehicle it may be adapted with equal facility to a horseless vehicle, and it is also obvious that the rear axle may be revolved in suitable bearings instead of the rear wheels revolving upon the axle.

While I have shown the screw-rods as projecting downward beneath the wagon, it is obvious that they may be inverted, so as to project upward alongside the body of the wagon, in which case these screw-rods will be threaded through the revolving member of the turn-table, the proper gearing connected therewith for revolving these screws or the nuts through which they may pass, so as to elevate and lower the body, the only object being to elevate the body upon four rigid rods and permit the body to be swung at an angle to the running-gear.

Having thus fully described my invention, what I claim as new and useful is—

1. In a wagon of the character described, a suitable running-gear, a platform supported thereby, elevating mechanism attached to the platform, a turn-table adapted to be raised and lowered by said mechanism, said turn-table consisting of a stationary and a revolving member, a body pivoted to the revolving member of the turn-table, and means connected with the rear wheels of the wagon for actuating the elevating mechanism during the travel of the wagon, substantially as specified.

2. In a wagon of the character described, a suitable running-gear, rear wheels supporting said running-gear, a turn-table, rods attached to the stationary member of said turn-table, mechanism connected with the rear wheels of the vehicle for operating said rods to raise and lower the turn-table, means under the control of the driver for throwing said mechanism into and out of action, a body hinged to the revolving member of the turn-table, and means for holding the body in an inclined position for unloading, as specified.

3. In a wagon of the character described, a suitable running-gear, elevating mechanism supported by said running-gear, a turn-table adapted to be raised and lowered by said elevating mechanism, a body hinged to the turn-table, sprocket-wheels journaled upon the hubs of the rear wheels of the wagon, sprocket-chains connecting the first-named wheels with the elevating mechanism, two clutch mechanisms adapted to lock either of the sprocket-wheels to the rear wheels of the wagon, foot-levers located in easy reach of the driver and connected with said clutch mechanisms so as the latter may be operated thereby, and means for automatically arresting the upward or downward movement of the elevating mechanism, as specified.

4. In combination with the running-gear of a wagon of the character described, four rods, means connected with said running-gear for raising or lowering said rods, a turn-table supported by said rods, said turn-table consisting of a stationary member, and a rotary member, a body hinged to the rotary member and adapted to be inclined, and means for holding the body in its inclined position, as specified.

5. In combination, a suitable running-gear, front and rear wheels upon which said running-gear is mounted, extensions formed with the hubs of the rear wheels, sprocket-wheels loosely journaled upon said extensions, clutches carried by said extensions for locking the sprocket-wheels to the hubs of the wagon-wheels, means under the control of the driver for operating the clutches, crank-shafts journaled upon the running-gear, sprocket-wheels secured upon the crank-shafts, sprocket-chains connecting the first and last named sprocket-wheels, a series of nuts, bevel-gears carried by said nuts, corresponding bevel-gears secured upon the inner ends of the crank-shafts and meshing with the first-named bevel-gears, a sprocket-chain connecting all of the nuts and adapted to revolve the same in unison, a series of screw-rods threaded through the nuts, a turn-table supported by said rods, said turn-table consisting of a stationary and a rotary member, ball-bearings interposed between these members, a central pin for holding the two members in their proper relative position, a body hinged to the revolving member, and a latch for holding the body against displacement, as and for the purpose set forth.

In testimony whereof I have hereunto affixed my signature in the presence of two subscribing witnesses.

THOMAS LEE.

Witnesses:
MARY E. HAMER,
L. W. MORRISON.